United States Patent [19]

Gorenstein

[11] Patent Number: 4,474,437
[45] Date of Patent: Oct. 2, 1984

[54] TEACHING AID FOR SIMULATING GRAVITATIONAL BENDING OF LIGHT

[76] Inventor: Marc V. Gorenstein, 1455 Commonwealth Ave., #34, Brighton, Mass. 02135

[21] Appl. No.: 367,309

[22] Filed: Apr. 12, 1982

[51] Int. Cl.$^3$ .............................................. G02B 3/02
[52] U.S. Cl. .................................... 350/432; 350/437
[58] Field of Search ............... 350/432, 436, 437, 451, 350/409, 410, 411

[56] References Cited

U.S. PATENT DOCUMENTS 4,073,578  2/1978  Welsh .................................. 350/432
4,151,752  5/1979  Perdijon ............................. 350/432

OTHER PUBLICATIONS

Gravitational Lens Simulator, Liebes, 8/23/1968, American Journal of Physics, vol. 37, p. 103.
Construction of a Gravitational Lens, Icke, 10/79, American Journal of Physics, 10/80.

*Primary Examiner*—John K. Corbin
*Assistant Examiner*—Paul M. Dzierzynski
*Attorney, Agent, or Firm*—Millen & White

[57] ABSTRACT

A lens for simulating the effect of gravity from a galaxy on light from a source effectively positioned at infinity with the light passing through the galaxy, the optical properties of the lens being equivalent to that of a lens having a flat plane surface on one side and a compound curved surface on the other side. The lens is rotationally symmetric about a central axis. The compound curve surface includes a convex region in the center thereof and a cusp shaped region in the outer edges thereof, said cusp shaped region being shaped nearly flat and parallel to the flat plane surface on the other side of the lens at the outer edge thereof. The convex region merges into the cusp shaped region through a flat plane prismatic region. The focal length of the convex region is less than the distance between the lens and the observer ensuring that the observer holding the lens (approximately at arm's length) on viewing an object through said lens will see multiple images of said object. This will simulate what an observer would see if the light from such an object were passing through a transparent galaxy located between the observer and the object.

10 Claims, 6 Drawing Figures

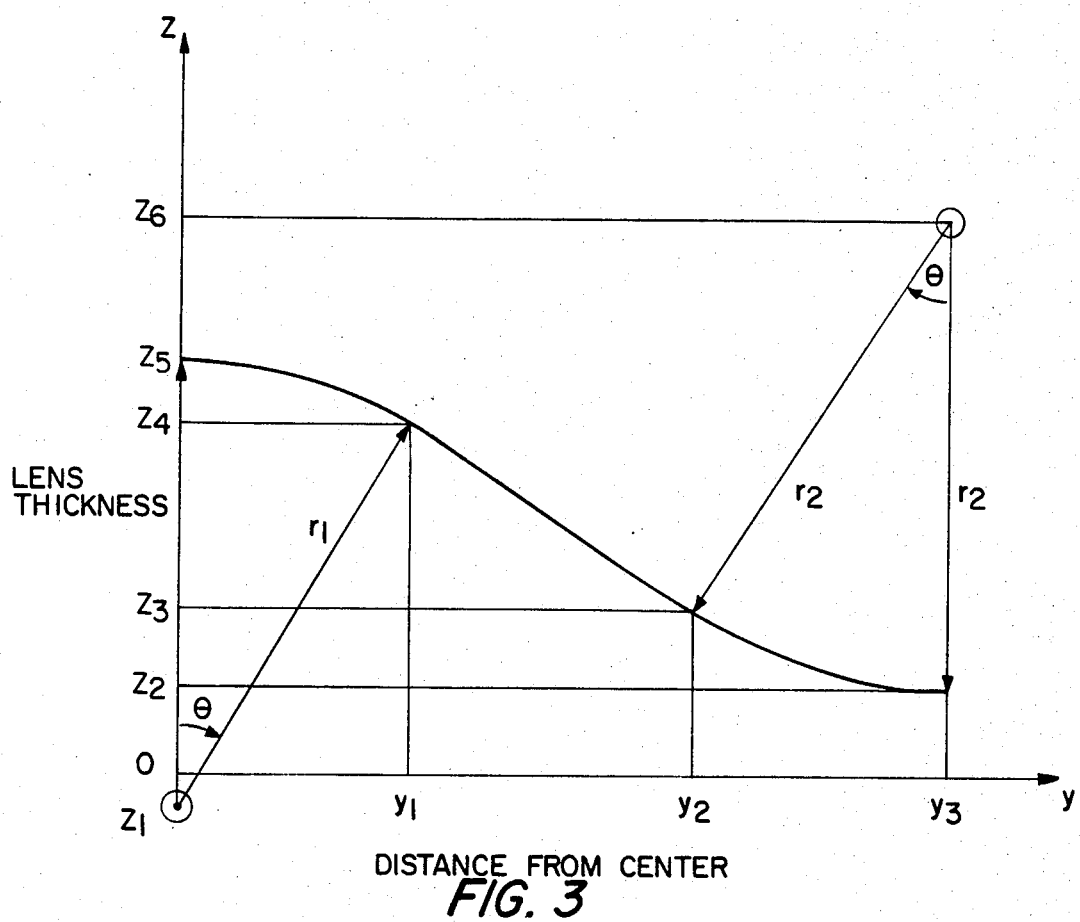

FIG. 3

TABLE OF LENS THICKNESS FOR 3-PIECE LENS

| | $Y_2 < Y \leq Y_3$ | $Y_1 < Y \leq Y_2$ | $0 \leq Y \leq Y_1$ |
|---|---|---|---|
| LENS EQUATION FOR EACH REGION | $Z = Z_2 + \frac{1}{2}\frac{(Y-Y_3)^2}{r_2}$ | $Z = Z_3 + (Y_2 - y)\theta$ | $Z = Z_4 + \frac{1}{2r_1}(y_1^2 - y^2)$ |
| LENS EQUATION AT SPECIFIED POINTS | at $Y_2$ $Z_3 = Z_2 + \frac{1}{2}\frac{(y_2-y_3)^2}{r_2}$ $\theta = \frac{y_3-y_2}{r_2}$ (RADIANS) $y_2$ = BOUNDARY BETWEEN PRISMATIC SECTION AND OUTER CUSP | at $y_1$ $Z_4 = Z_3 + (y_2-y_1)\theta$ $\theta = \frac{y_1}{r_1}$  $r_1 = \frac{y_1}{y_3-y_2} r_2$ $y_1$ = BOUNDARY BETWEEN PRISMATIC SECTION AND CONVEX LENS | $Z_1 = Z_4 - r_1$ $Z_1$ = CENTER OF $r_1$ RADIUS FOCAL LENGTH AT CENTER = $(r_1/n-1)$ n = INDEX OF REFRACTION |

FIG. 4

TEACHING AID FOR SIMULATING GRAVITATIONAL BENDING OF LIGHT

BACKGROUND OF THE INVENTION

This invention relates to an apparatus for simulating the effect of gravity on light and to a method for constructing said apparatus. More particularly, the apparatus comprises a lens for simulating the effect when light from a distant source passes through a gravity field such as that from a spherical galaxy having a certain structure. Furthermore, the invention also relates to a description of the shape necessary to mimick the effect, and to the method of using such a lens to simulate the desired effect.

The bending effect of gravity on light rays was originally predicted by Albert Einstein, from which it follows that a gravity field would mimic a lens and produce images. More specifically, the effect of gravity on light from a source not only would make the light source appear out of position, but it could also produce multiple images of a single source. Thus, to a properly positioned observer, a distant quasar would appear as triplets or quintuplets if its light passed through a galaxy of a certain structure.

The theory behind the bending of light as a result of gravity has led to attempts to construct a lens capable of mimicking the distortion caused by such a field. One such lens is disclosed in, Construction of a Gravitational Lens; Am. J. Phys., Vol. 48, NO. 10, October 1980 pg. 883. In this article, a cylindrical gravitational lens is described for imitating the effect of the gravity field from a black hole. The lens is rotationally symmetric, flat on one side, and on the other side has a surface that obeys the equation:

$$T=[2R/(n-1)] \log (r_o/r),$$

wherein T is the thickness of the lens, R corresponds to the Schwarzschild radius of the black hole being imitated, n is the index of refraction of the lens material, $r_o$ is the maximum possible radius of the lens, and r is the distance between the lens axis and the point at which the thickness T is measured. FIG. 1 schematically shows the cross-section of such a lens. This lens will be referred to hereinafter as a "cusp" shaped lens. Although the lens described in the above-discussed article is described as fairly accurately mimicking the effect of a black hole on light passing through its gravity field, it is ineffective to mimic the more common effect of the gravitational field of a galaxy on light passing therethrough.

Another structurally related prior art device is known as a Schmidt corrector plate developed by B. Schmidt around 1930, and discussed in the textbook Principles of Optics, by Born and Wolf, Pergamon Press. More particularly, the Schmidt corrector plate is employed in photographing wide angular fields and has a form somewhat similar to that of the above-discussed gravitational lens. However, even though the general shape of a Schmidt corrector plate is similar to that of a gravitational lens, it is not useful as a lens for simulating the discussed gravity effect on light because its focal length (typically 0.7 kilometers) is much greater than the distance between the observer and the gravitational lens (typically 15 cm to 75 cm), and therefore in the case of the Schmidt corrector plate, it is impossible to observe the multiple imaging effect over a useful distance range.

OBJECTS OF THE INVENTION

Thus, it is an object of the invention to simulate the effect of a gravity field on light passing through such a field.

It is another object of the invention to simulate the effect of a gravity field from a galaxy on light passing through the galaxy.

Upon further study of the specification and appended claims, further objects and advantages of this invention will become apparent to those skilled in the art.

SUMMARY OF THE INVENTION

In accordance with the invention there is provided a lens having a first region, a second region and a third region, each of said first, second and third regions merging smoothly into each other. More specifically, the first region is located in the central part of the lens and approximates a simple convex lens in shape. The first region merges smoothly into the second region which approximates a flat conic section, which in turn merges smoothly into the third region which approximates a concave shaped cusp region. The first region, i.e., convex part, serves to mimic the effect of light bending in the center of a galaxy, and the third region, i.e., cusp shape, mocks the bending occurring near the outer region of the galaxy's mass, i.e., the region of reduced mass relative to the center of the galaxy. The focal length of the central convex part is shorter than the typical observer-lens distance, and the bend angle approaches zero toward the periphery.

This construction ensures that when viewing a small distant object, the central part produces a demagnified and inverted image, while the outer part produces two opposing distorted images. This simulates what will be observed when a distant star is viewed through a, e.g. transparent, galaxy in the foreground.

In the lens construction it is important that the lens have a spherical section in the middle. The lens then must become continually thinner from the center outward, reaching its minimum thickness at the periphery. Thus, one distinguishing characteristic is that the annular focal length, i.e., the focal length of the lens for a given segment in the direction of the periphery, must monotonically increase and become greater than the typical lens-source or lens-observer distance (whichever is larger). Typically, a useful limit for this range is about 1-5 meters.

Another important special case occurs when the observer, lens, and source lie directly on a line. For a rotationally symmetric lens, a ring of light will be observed replacing the two opposing images. (The central demagnified image is still seen.) This ring phenomenon and central image by themselves essentially characterize the main optical phenomenon produced by this lens.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 3 is a graphical representation of one half the curved surface of the gravitational lens of the invention showing the three regions of FIG. 2 in greater detail;

FIG. 4 is a table mathematically describing the surface of the gravitational lens represented in FIG. 3, region by region;

DETAILED DISCUSSION OF THE INVENTION

Figure 1:
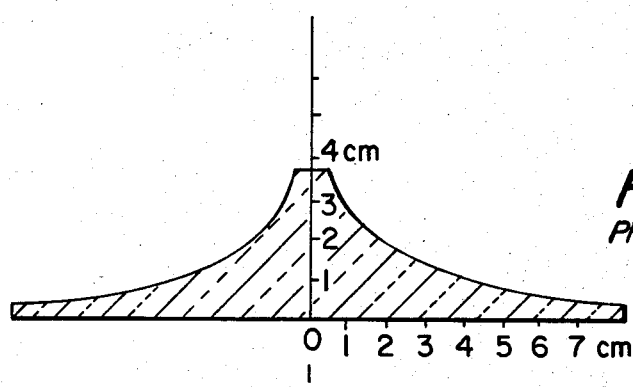
FIG. 1 is a cross-section schematic view of a prior art gravitational lens.

FIG. 1 illustrates the previously discussed prior art cusp shaped lens used for imitating the effect of gravity from a black hole on light. More particularly, the lens of FIG. 1 can be used only to illustrate the effect of gravity from a black hole on light passing near the black hole. The lens of FIG. 1 is comprised of a cusp surface which shows only two images; one on each side of a black hole. When an object is viewed through the lens of FIG. 1, there is viewed an inverse image on one side of the center of the lens, and a distorted non-inverted image on the other side of the center of the lens.

Figure 2:
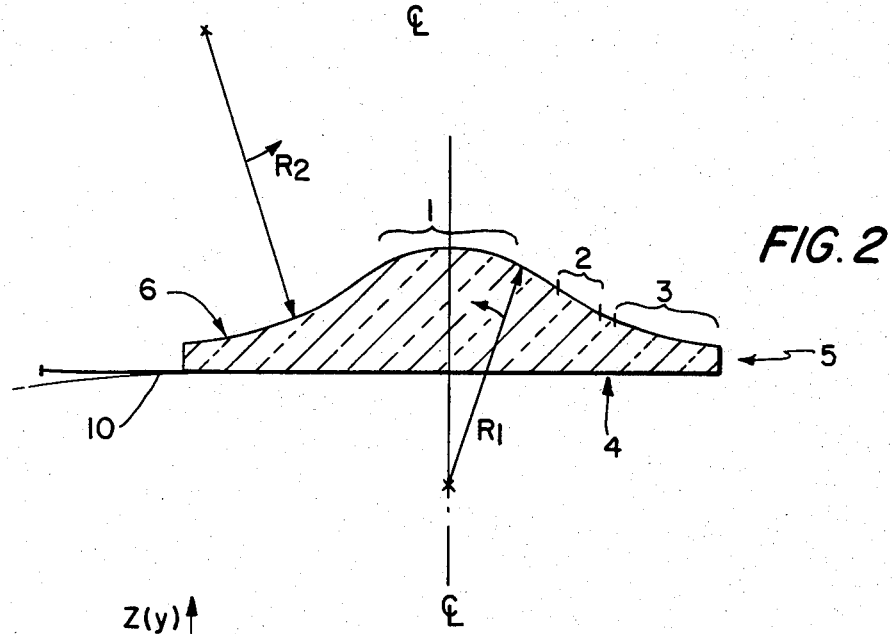
FIG. 2 is a cross-section schematic view of the gravitational lens of the invention showing the three distinct regions for simulating the passage of light through a transparent galaxy.

The lens of the invention is shown in FIG. 2 and has a central convex region 1 for causing light rays to converge, an intermediate region 2 causing bending of light passing therethrough at a uniform angle, i.e., as determined by the index of refraction of the material of the lens, and an outer cusp region 3 similar to the cusp of the prior art lens of FIG. 1. The distinguishing feature of this lens is that the focal length of the central convex region is somewhat less than the anticipated observer-lens distance. A range from 2 to 15 cm in focal length is acceptable.

The top surface of the lens of FIG. 2 is defined by two hypothetical radii of curvature. The central region is determined by a radius $R_1$, which effectively defines a convex shape, and the outer region is determined by a radius $R_2$ which effectively defines a "cusp" shape. The two regions defined by the radii $R_1$ and $R_2$ merge with each other through an intermediate region (region 2 of FIG. 2) which is a generally conical, i.e., a straight line or flat surface having no curvature. When used as a teaching aid, the lens is held by holding means 10.

The invention is better illustrated in the graphical representation of FIG. 3, and the table of FIG. 4. More particularly, FIG. 3 specifically illustrates the first region, i.e., the central convex region, of the lens as extending radially from O to $Y_1$. The second region is shown as a generally straight line having a predetermined slope and extending from $Y_1$ to $Y_2$. The outer region is shown as having a cusp shape and extending from $Y_2$ to $Y_3$. The equations defining the height or thickness Z of the lens along each of these three regions are shown in table of FIG. 4. The lens equation for regions 1 and 3 use a parabolic approximation to a spherical shape.

The lens shown in FIG. 3 will always have a minimum thickness as shown at $Z_2$. The cusp shaped region begins at a thickness of $Z_2$ and progresses to a thickness of $Z_3$ according to the equation corresponding to $Y_2 < Y \leq Y_3$. Likewise, the conical region begins at a thickness corresponding to $Z_3$ and progresses through to a thickness of $Z_4$ in accordance with the equation corresponding to $Y_1 < Y \leq Y_2$. Finally the central convex region progresses from a thickness of $Z_4$ in accordance with the equation corresponding to $O \leq Y \leq Y_1$. The actual thickness at each region is more clearly defined in the table from a detailed reading thereof.

In a preferred embodiment, the lens will have the following dimensions:

(a) The radial distance from $Y=O$ to $Y=Y_3$ will be about 5–25 cm, preferably 7.37 cm;

(b) The radial distance from $Y=O$ to $Y=Y_2$ will be about 2–15 cm, preferably 3.18 cm;

(c) The radial distance from $Y=O$ to $Y=Y_1$, will be about 0.5–10 cm, preferably 1.52 cm.

Thus, the width Z of each individual region can be easily calculated. In the preferred embodiment, the radius of curvature $r_1$ will be equal to about 5.53 cm and will sweep from a position perpendicular to and below the Y axis, i.e., below the bottom flat surface of the lens, through angle $\theta = 16.0°$. The radius of curvature $r_2$ will be equal to about 15.24 cm and will sweep from a position above the top surface of the lens and perpendicular to the Y axis at the edge of the lens through the same angle $\theta$. The angles are equal owing to the flat surface from $Y_1$ to $Y_2$. The minimum base thickness $Z_2$ of the lens will equal about 1.27 cm and the remaining dimensions can be calculated from the equations provided in the table of FIG. 4. The bending power of such a lens will depend also on the index of refraction of the material used which, like the prior art gravitational lens, is preferred to equal about 1.4. In particular, region 1 is convex in shape and thus, has a focal length, f, given by $f = r_1/(n-1)$ (n=index of refraction, and r is the radius of the sphere of the spherical section of the lens involved, with the subscript designating each region), and in accordance to the values set forth above for the preferred embodiment will equal (5.53/0.4), or approximately 14 cm.

The critical parameter is the focal length of the central convex section. This focal length is given by $f = r_1/(n-1)$ as defined in FIG. 4. This focal length must be shorter than the anticipated observer-lens distance as mentioned before. The values of the other parameters in FIG. 4 can be varied subject to this restriction and the inequalities in FIG. 4. For example, the overall radius $Y_3$ can be from 5 to 25 cm, the outer radius of the conical section $Y_2$ can be from 2 to 15 cm, and the radius of the convex section $Y_1$ can be from 0.5 to 10 cm (as long as $Y_1 < Y_2 < Y_3$).

Figure 6:
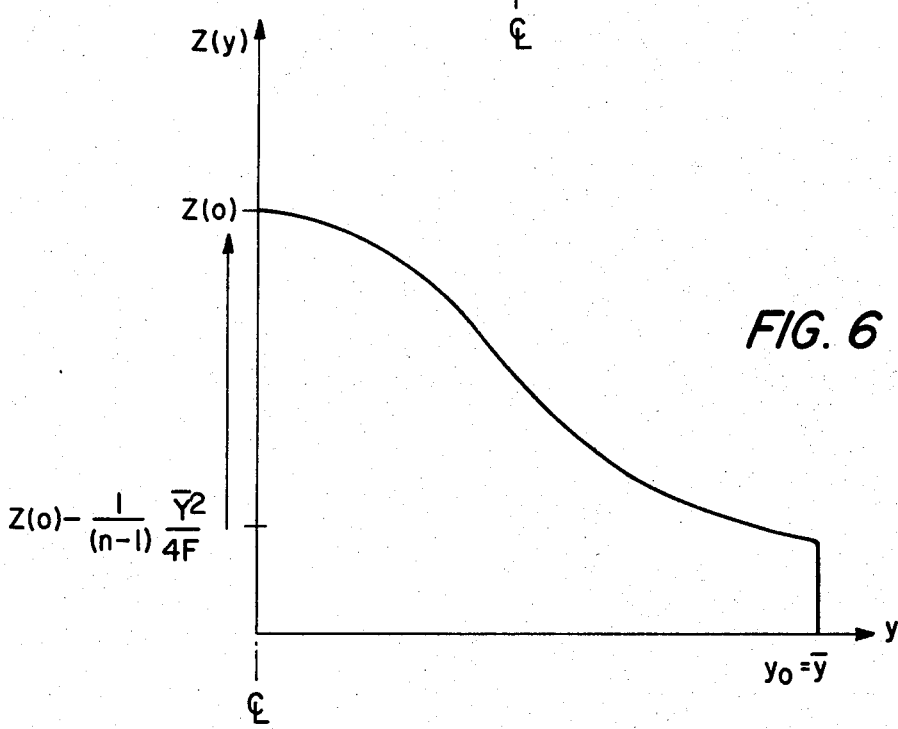
FIG. 6 is a graphical representation of half the curved surface of the gravitational lens of the invention in a manner similar to that of FIG. 3 for describing the surface of the lens in an alternative mathematical manner.

An alternative method of describing the lens thickness and profile of the lens is by means of quadratic and quartic terms. More particularly as shown in FIG. 6, the surface profile of the lens will obey the following equation:

$$Z_{(y)} - Z_{(o)} = \left[\frac{1}{n-1}\right] \left[-\frac{Y^2}{2F}\right] [1 - \tfrac{1}{4}(Y/\overline{Y})^2] \quad [\overline{Y} \geq Y_0]$$

wherein
Y = radial distance from center (cm)
F = focal length (cm)
Yo = radial size of lens (cm)

$\overline{Y}$ = position of zero bend ($\overline{Y} \geq Y_o$)
n = index of refraction
$Z_{(y)}$ = thickness of lens (cm)
$Z_{(o)}$ = maximum height of lens at the center.

This polynomial expression, having fewer adjustable parameters than the previous expressions, affords less flexibility in specifying the lens shape, but may be convenient in some applications. The range of these parameters that will yield a lens with the desired properties are specified hereinafter. $Y_o$ is the lens radius, $d_1$ the minimum observer-lens distance, and $d_2$ the maximum lens-source distance. Accordingly, by defining the properties of the lens in this manner, the values of F and $\overline{F}$ must satisfy:

$$F < d_1$$

and $$Y_o \leq \overline{Y} \leq Y_o / \sqrt{1 - (F/d_2)} .$$

(Note that if $d_2$ is set to infinity, $Y_o = \overline{Y}$.) Specifying $Y_o = \overline{Y} = 7.37$ cm, and $f = 14.0$ cm will yield a lens with properties similar, but not identical, to the previous convex, conical, cusp specification.

Figure 5:
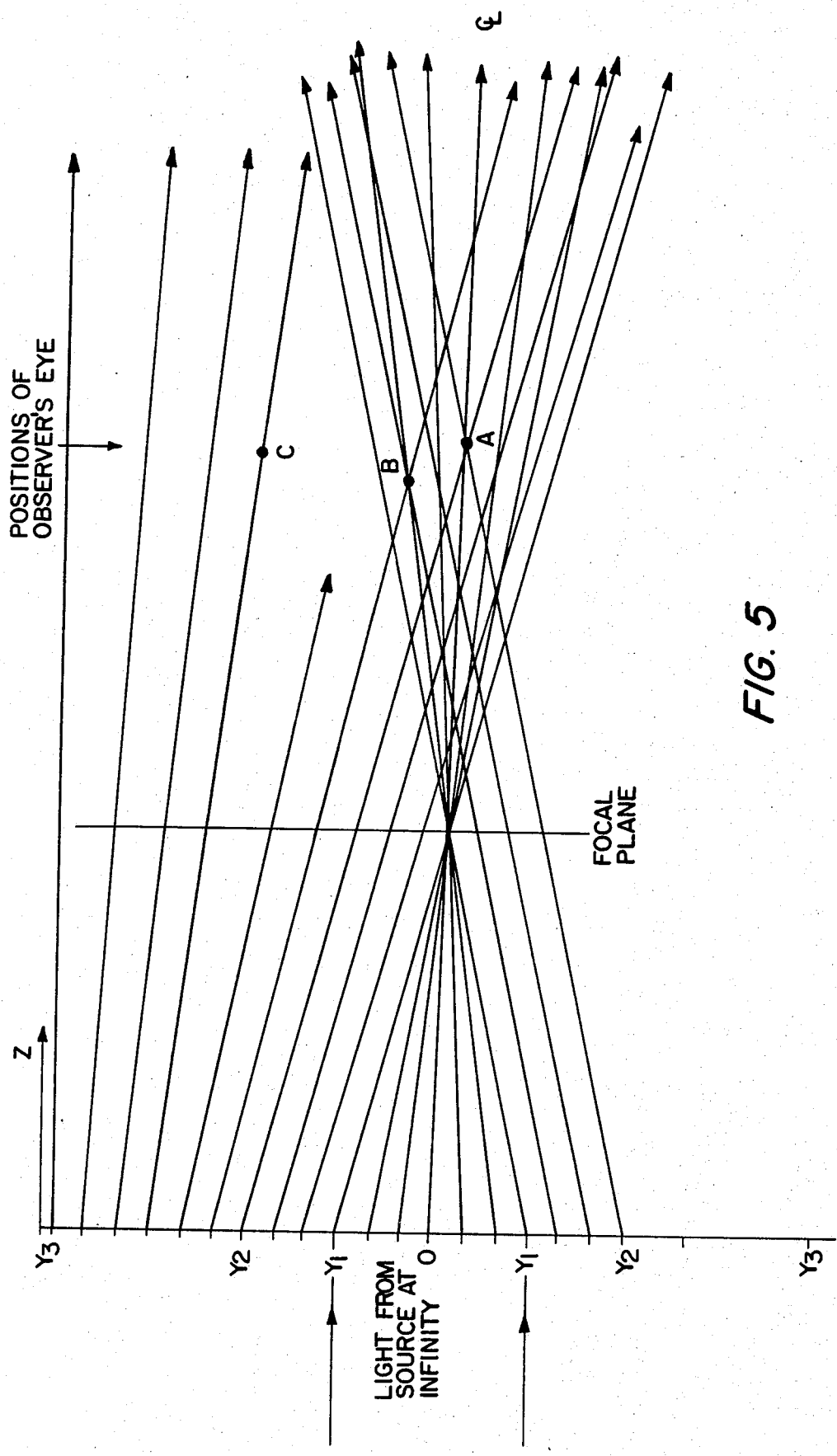
FIG. 5 is a graphical representation of the path followed by light from a source at what is effectively a position at infinity passing through the gravitational lens of the invention.

When using the lens, an object will be viewed through either side of the lens. As illustrated in FIG. 5, separate images will be seen at three different locations by the viewer. For simplicity, it can be assumed that light rays from the object viewed will effectively be light from a source at infinity. The central region 1 will bring the rays originating from a source at infinity to a focus. As shown in FIG. 5, there will be three locations where the viewer's eye can be placed to see images.

At point A along the center line as shown, the observer sees a demagnified inverted image of the source produced by the central focusing part of the lens. In addition, at A there will be a ring surrounding the image. At point B the observer will also see a demagnified inverted image of the source also produced by the region 1. The observer at B will see in addition, two images, i.e., two additional ones about the center image.

An observer whose eye is at point C will merely see a single image. Thus, by viewing an object in the manner described, the effect of gravity such as from a galaxy having the light passing therethrough can be simulated to create images corresponding to what would actually be seen by an observer under such circumstances, i.e., the lens effectively mimicks a transparent galaxy.

When using the lens, an observer will generally hold the lens at about arm's length to view an object. More particularly, by arm's length is meant at a distance of 15 to 75 cm, corresponding to the general ranges set forth for the lens dimensions. Furthermore, if the preferred dimensions discussed with reference to FIG. 3 are used, the lens should be held at a distance of about 30 cm from the observer's eye.

It is preferred that the lens be constructed of PLEXIGLAS material whose index of refraction is preferably about 1.4 to 1.6. However, any convenient transparent dielectric materials can be used. A typical list of such materials can be found in the American Institute of Physics Handbook, 3rd ed., 1972, pgs. 86–102, 6–108, where indices of refraction of usable materials vary from about 1.4 to 1.9. Thus, although it is preferred that the material used have an index of refraction of about 1.4. The index of refraction can vary between 1.4 to 1.9, and still be useful for constructing a gravitational lens which will be small enough and have a focal length such that it can be easily carried around by an observer.

To construct the lens, a blank, preferably of PLEXIGLAS is placed on a lathe or other conventional machining apparatus and the outer edge of the lens blank is cut to have a radius of curvature which corresponds to the previously discussed equations. More particularly, following the first example, the radius of curvature is preferred to be about 15.24 cm, and the cut or shaping will be made so that when facing the compound surface of the lens, the region will appear cusp or concave shaped. The cut will extend over an angular measure of about 160° if the preferred radius of curvature is used. The radian measure of this region will obviously vary for other radii of curvature in accordance with the mathematical formulas. The outer edge of this lens will be cut to have a minimum thickness which if the preferred values are used, will equal about 1.27 cm. The cut will be continued toward the center to form a conic surface of revolution which if the preferred values are used will extend radially about 1.66 cm. Then the cutting means will be adjusted to cut a generally convex surface on the lens blank having a radius of curvature of about 5.53 cm and the sweep will also be about an angle $\theta$ equal to about 16.0° if the preferred values are used.

It is intended that the lens of the invention be used as a teaching aid. Thus, a holder or holding means will be provided which is associated with the lens. More particularly, the holding means can comprise any conventional structure such as holder's conventionally used in holding magnifying lenses. Furthermore, it is intended that the teaching aid comprise a single lens made as a unitary piece. Alternatively, the lens can be a compound lens made of three different type sections, i.e., prismatic, convex and cusp shaped.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A lens for simulating the effect of gravity from a galaxy on light from a source effectively positioned at infinity with the light passing through the galaxy, comprising a flat plane surface on one side, and a compound curve surface on the other side, said lens being generally circular in shape and said compound curve surface having a partly convex region in the center thereof having a focal length which is short relative to the distance to an observer using the lens, and a cusp shaped region in the outer region thereof, said cusp shaped region being shaped generally to be flat and parallel to the flat plane surface on the other side of the lens at the outer edge of the lens, said convex region merging into the cusp shaped region through a flat plane prismatic region, and said lens resulting from said compound surface being such that an observer viewing an object through said lens can see images of said object when holding said lens at about 15 cm to 75 cm away from the observer's eye at three separate regions of said lens.

2. A lens as in claim 1, wherein the surface of said cusp shaped region is shaped to obey the equation, $$Z = Z_2 + \tfrac{1}{2}((Y - Y_3)^2 / r_2)$$

wherein,

Z is the thickness of the lens from one surface to the other along said cusp shaped region, $Z_2$ is the minimum thickness of the lens from one surface to the other at the outer edge thereof, $Y_3$ is the total radial width of the lens, Y is the radial width of the lens corresponding to said cusp shaped region at any point thereon, and $r_2$ is the radius of curvature of said cusp shaped region.

3. A lens as in claim 2, wherein the surface of said prismatic region is shaped to obey the equation, $$Z = Z_3 + (Y_2 - Y)\theta$$

wherein Z is the thickness of the lens at any point along said prismatic region, $Z_3$ is the thickness of the lens at the junction between the prismatic region and the cusp shaped region, $Y_2$ is the radial width of the lens at said junction, Y is the radial width of the lens at any point along said prismatic region, and $\theta$ is the slope of the surface of the cusp shaped region.

4. A lens as in claim 3, wherein the surface of said convex region is shaped to obey the equation, $$Z = Z_4 + (1/2r_1)(Y_1^2 - Y^2)$$

wherein Z is the thickness of the lens from one surface to the other at any point along said convex region, $Z_4$ is the thickness of the lens at the edge between the convex region and the prismatic region, $Y_1$ is the radial width of the convex region, Y is the width radially at any point along the convex region, and $r_1$ is the radius of curvature of said convex region.

5. A lens as in claim 4, wherein total radial width of the lens is about 7.37 cm, the radial width to the point of transition between the cusp shaped region and the prismatic region is about 3.18 cm, the radial width to the point of transition between the convex and prismatic region is about 1.52 cm, the radius of curvature for the cusp shaped region is about 15.24, the radius of curvature for the convex region is about 5.53 cm, the thickness of the lens from surface to surface at the minimum thickness outer edge thereof is about 1.27 cm, the index of refraction of the material comprising the lens is about 1.4, and $\theta$ is equal to a sweep of about 16.0° for both the cusp shaped region and the convex region.

6. A lens as in claim 1, wherein the profile of lens thickness for the compound surface obeys the equation $$Z_{(y)} - Z_{(o)} = \left[\frac{1}{n-1}\right]\left[-\frac{Y^2}{2F}\right]\left[1 - \frac{1}{4}\left(\frac{Y}{\overline{Y}}\right)^2\right]$$

with $\overline{Y} \geq Y_o$, and wherein

Y is the radial distance from the center of the lens at any point;

F is the focal length of the convex region;

$Y_o$ is the radial width of the lens;

$\overline{Y}$ is the radial width at the position of zero bend of the lens, n is the index of refraction of the lens material $Z_{(y)}$ is the thickness of the lens at any point, $Z_{(o)}$ is the height of the lens at the center thereof.

7. A lens as in claim 6, wherein F is about 14.0 cm, $Y_o$ is about 7.37 cm, n is about 1.5, and $Z_{(o)}$ is about 1.79 cm.

8. A lens as in claim 1, wherein said lens is made of PLEXIGLAS.

9. A teaching aid for simulating the effect of gravity on light passing through a transparent galaxy, comprising a single lens, having a size so as to be easily carried by a person, said single lens having optical properties equivalent to a flat plane surface on one side, and a compound curve surface on the other side, said lens being circular in shape said compound curve surface having a partly convex region in the center thereof and a cusp shaped region in the outer region thereof, said cusp shaped region being shaped to be flat and parallel to the flat plane surface on the other side of the lens at the outer edge of the lens, said convex region merging into the cusp shaped region through a flat plane prismatic region, and the focal length of said lens resulting from said compound surface being such that an observer viewing an object through said lens can see images of the object when holding said lens whereby said teaching aid provides images which simulate the images of an object observed by an observer through a galaxy.

10. A teaching aid as in claim 9, further comprising holding means for said lens.

* * * * *